United States Patent
Cheng et al.

(10) Patent No.: US 12,524,998 B2
(45) Date of Patent: Jan. 13, 2026

(54) DATA PROCESSING METHOD AND DEVICE

(71) Applicant: ALIBABA GROUP HOLDING LIMITED, George Town (KY)

(72) Inventors: Wenhua Cheng, Hangzhou (CN); Niqi Lyu, Hangzhou (CN); Liang You, Beijing (CN); Xin Long, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 381 days.

(21) Appl. No.: 18/547,722

(22) PCT Filed: Feb. 17, 2022

(86) PCT No.: PCT/CN2022/076559
§ 371 (c)(1),
(2) Date: Aug. 24, 2023

(87) PCT Pub. No.: WO2022/179424
PCT Pub. Date: Sep. 1, 2022

(65) Prior Publication Data
US 2024/0303970 A1 Sep. 12, 2024

(30) Foreign Application Priority Data
Feb. 25, 2021 (CN) .......................... 202110212564.1

(51) Int. Cl.
*G06V 10/77* (2022.01)
*G06V 10/764* (2022.01)
*G06V 10/774* (2022.01)

(52) U.S. Cl.
CPC ........ *G06V 10/7715* (2022.01); *G06V 10/774* (2022.01); *G06V 10/764* (2022.01)

(58) Field of Classification Search
CPC ............. G06V 10/7715; G06V 10/774; G06V 10/764; G06V 10/44; G06V 10/82;
(Continued)

(56) References Cited

U.S. PATENT DOCUMENTS 10,176,405 B1 * 1/2019 Zhou ..................... H04N 7/181
10,963,757 B2 * 3/2021 Zhou .................... G06V 10/764
(Continued)

FOREIGN PATENT DOCUMENTS

| CN | 110704850 A | 1/2020 |
| CN | 112364975 A | 2/2021 |
| CN | 113298083 A | 8/2021 |

OTHER PUBLICATIONS

International Search Report, Application No. PCT/CN2022/070959, Jul. 21, 2022, p. 2.
(Continued)

*Primary Examiner* — Michael S Osinski
(74) *Attorney, Agent, or Firm* — FisherBroyles, LLP; Susan M. Oiler

(57) ABSTRACT

Data processing method and apparatus are disclosed. The method includes: processing input data based on the data processing network, to obtain intermediate data; acquiring a fixed attention feature output by the attention network, which is obtained after training the model with at least an initialized attention feature, respective attention weights included in the initialized attention feature are not all the same; processing the intermediate data based on the data aggregation network and according to the fixed attention feature, to obtain output data. The fixed attention network does not receive any input previously, that is, attention feature output by the attention network is irrelevant to input data. The fixed attention feature can not only allow a more important parameter of the model to play a greater role to improve accuracy of the model and determine importance of the parameter, but also be conducive to further compression of the model.

20 Claims, 4 Drawing Sheets

(58) Field of Classification Search
CPC ...... G06V 10/454; G06V 20/41; G06V 10/40; G06V 10/761; G06F 18/241; G06F 40/30; G06F 16/5846; G06F 16/5854; G06F 18/214; G06F 40/284; G06N 3/08; G06N 3/045; G06N 3/09; G06N 3/0464; G06N 3/044; G06N 3/084; G06N 3/0442; G06N 3/048; G06N 3/04; G06N 3/0455; G06N 3/047; G06N 3/0499; G06N 3/088; G06N 3/0895; G06N 3/094; G06N 3/096; G06N 20/10

See application file for complete search history.

(56) References Cited

U.S. PATENT DOCUMENTS

| | | | | |
|---|---|---|---|---|
| 11,010,692 | B1* | 5/2021 | Mazor | G06N 3/08 |
| 11,455,788 | B2* | 9/2022 | Liu | G06V 30/153 |
| 11,709,915 | B2* | 7/2023 | Perera | G06N 3/0475 |
| | | | | 382/159 |
| 12,008,788 | B1* | 6/2024 | Li | G06N 3/045 |
| 12,141,701 | B2* | 11/2024 | Wong | G06N 3/0495 |
| 2017/0127016 | A1* | 5/2017 | Yu | G06N 3/0455 |
| 2018/0189572 | A1* | 7/2018 | Hori | G06N 3/0442 |
| 2020/0226410 | A1* | 7/2020 | Liu | G06V 30/153 |
| 2020/0320281 | A1* | 10/2020 | Chen | G06V 10/764 |
| 2020/0335108 | A1* | 10/2020 | Meng | G06N 3/084 |
| 2020/0372324 | A1* | 11/2020 | Yamauchi | G06N 3/044 |
| 2022/0138534 | A1* | 5/2022 | Veyseh | G06F 40/30 |
| | | | | 706/15 |
| 2022/0198316 | A1* | 6/2022 | Mazor | G06N 20/00 |
| 2022/0277015 | A1* | 9/2022 | Zhang | G06N 3/045 |
| 2022/0309653 | A1* | 9/2022 | Hassanpour | G06V 10/82 |
| 2023/0033442 | A1* | 2/2023 | Xiang | G06N 3/088 |
| 2023/0058194 | A1* | 2/2023 | Zhang | G06F 16/355 |
| 2023/0103340 | A1* | 4/2023 | Gao | G06V 10/464 |
| 2023/0153567 | A1* | 5/2023 | Keski-Valkama | G06N 3/04 |
| | | | | 706/15 |
| 2023/0274420 | A1* | 8/2023 | Seah | G06N 3/096 |
| | | | | 382/128 |
| 2024/0013573 | A1* | 1/2024 | Liu | G06V 10/24 |
| 2024/0244274 | A1* | 7/2024 | Koyuncu | H04N 19/119 |

OTHER PUBLICATIONS

International Search Report, Application No. PCT/CN2022/076559, Sep. 1, 2022, p. 2.
English Translation of Chinese Office Action, Application No. 2021102125641, May 31, 2024, pp. 1-6.

* cited by examiner

DATA PROCESSING METHOD AND DEVICE

CROSS-REFERENCE TO RELATED APPLICATIONS

The present invention is filed under 35 U.S.C. § 371 as the U.S. national phase of International Patent Application No. PCT/CN2022/076559, filed Feb. 17, 2022, which designated the United States and which claims the benefit of Chinese Invention Patent Application No. 202110212564.1, filed Feb. 25, 2021, which is hereby incorporated by reference in its entirety.

TECHNICAL FIELD

The present application relates to the field of computer technologies, and in particular to a data processing method and a data processing apparatus.

BACKGROUND

With the rapid development of technology, there is an increasing need to classify data such as images, texts, videos, audios, etc. For example, regarding images, at present, one way to classify images is to extract features of images, establish a classification space and select an appropriate classification model, such as CNN (Convolutional Neural Networks), etc. In addition, the classification model is trained based on the features of images and the classification space, and then images are classified based on a trained classification model.

While in many situations, image classification heavily relies on local features of an image, such as local features of an object in the image, etc. However, existing classification models mainly rely on global features of an image to classify images, which results in lower classification accuracy.

SUMMARY

In order to at least improve classification accuracy, the present application illustrates a data processing method and a data processing apparatus.

In a first aspect, the present application illustrates a data processing method applied to a model, and the model at least includes a data processing network, an attention network and a data aggregation network, and the method includes: processing input data based on the data processing network, to obtain intermediate data; acquiring a fixed attention feature output by the attention network, wherein the fixed attention feature is obtained after training the model with at least an initialized attention feature, and respective attention weights included in the initialized attention feature are not all the same; and processing the intermediate data based on the data aggregation network in the model and according to the fixed attention feature, to obtain output data.

In an optional implementation, the initialized attention feature includes one layer of attention weights and multiple attention weights in the one layer of attention weights are not all the same; or, the initialized attention feature includes at least two layers of attention weights and attention weights of different layers are not all the same.

In an optional implementation, the method further includes: acquiring a sample input data set, wherein the sample input data set includes at least one sample input data; building a network structure of the model, wherein the network structure at least includes the data processing network, the attention network and the data aggregation network, and the attention network is configured for outputting an attention feature, and wherein the sample input data is not input to the attention network; and using the sample input data in the sample input data set to train a network parameter of the model until the network parameter converges, to obtain the model.

In an optional implementation, the data processing network is configured for acquiring the sample input data and processing the sample input data, to obtain sample intermediate data; the attention network is configured for outputting the attention feature and the output attention feature includes a plurality of attention weights; and the data aggregation network is configured for processing the sample intermediate data according to the attention feature output by the attention network, to obtain a sample output result.

In an optional implementation, an input end of the model includes an input end of the data processing network; an output end of the data processing network is connected to an input end of the data aggregation network; an output end of the attention network is connected to the input end of the data aggregation network; and an output end of the model includes an output end of the data aggregation network.

In an optional implementation, the method further includes: pruning, after starting to train the network parameter of the model, a channel in the data processing network according to the attention network.

In an optional implementation, pruning the channel in the data processing network according to the attention network includes: acquiring an attention weight of each channel in the attention network; and pruning the channel in the data processing network according to the attention weight.

In an optional implementation, pruning the channel in the data processing network according to the attention weight includes: for any one channel in the attention network, determining whether an attention weight of the channel in the attention network is less than a preset channel pruning threshold, and in a case where the attention weight of the channel in the attention network is less than the preset channel pruning threshold, pruning a channel in the data processing network corresponding to the channel in the attention network.

In an optional implementation, the method further includes: in the case where the attention weight of the channel in the attention network is less than the preset channel pruning threshold, acquiring a first number of channels remaining in the data processing network and acquiring a second number of channels in the data processing network corresponding to the channel in the attention network; determining whether a difference between the first number and the second number is greater than or equal to a preset minimum channel threshold; and in a case where the difference is greater than or equal to the preset minimum channel threshold, executing the step of pruning the channel in the data processing network corresponding to the channel in the attention network.

In a second aspect, the present application illustrates a data processing apparatus applied to a model, and the model at least includes a data processing network, an attention network and a data aggregation network, and the apparatus includes: a first processing module, configured for processing input data based on the data processing network, to obtain intermediate data; a first acquiring module, configured for acquiring a fixed attention feature output by the attention network, wherein the fixed attention feature is obtained after training the model with at least an initialized attention feature, and respective attention weights included in the initialized attention feature are not all the same; and a second processing module, configured for processing the intermediate data based on the data aggregation network in the model and according to the fixed attention feature, to obtain output data.

In an optional embodiment, the initialized attention feature includes one layer of attention weights and multiple attention weights in the one layer of attention weights are not all the same; or, the initialized attention feature includes at least two layers of attention weights and attention weights of different layers are not all the same.

In an optional embodiment, the apparatus further includes: a second acquiring module, configured for acquiring a sample input data set, wherein the sample input data set includes at least one sample input data; a building module, configured for building a network structure of the model, wherein the network structure at least includes the data processing network, the attention network and the data aggregation network, and the attention network is configured for outputting an attention feature, and wherein the sample input data is not input to the attention network; and a training module, configured for using the sample input data in the sample input data set to train a network parameter of the model until the network parameter converges, to obtain the model.

In an optional embodiment, the data processing network is configured for acquiring the sample input data and processing the sample input data, to obtain sample intermediate data; the attention network is configured for outputting the attention feature and the output attention feature includes a plurality of attention weights; and the data aggregation network is configured for processing the sample intermediate data according to the attention feature output by the attention network, to obtain a sample output result.

In an optional embodiment, an input end of the model comprises an input end of the data processing network; an output end of the data processing network is connected to an input end of the data aggregation network; an output end of the attention network is connected to the input end of the data aggregation network; and an output end of the model comprises an output end of the data aggregation network.

In an optional embodiment, the apparatus further includes: a pruning module, configured for pruning, after starting to train the network parameter of the model, a channel in the data processing network according to the attention network.

In an optional embodiment, the pruning module includes: an acquiring unit, configured for acquiring an attention weight of each channel in the attention network; and a pruning unit, configured for pruning the channel in the data processing network according to the attention weight.

In an optional embodiment, the pruning module includes: a first determining sub unit, configured for determining, for any one channel in the attention network, whether an attention weight of the channel in the attention network is less than a preset channel pruning threshold; and a pruning sub unit, configured for pruning, in a case where the attention weight of the channel in the attention network is less than the preset channel pruning threshold, a channel in the data processing network corresponding to the channel in the attention network.

In an optional embodiment, the pruning unit further includes: an acquiring sub unit, configured for acquiring, in the case where the attention weight of the channel in the attention network is less than the preset channel pruning threshold, a first number of channels remaining in the data processing network and acquiring a second number of channels in the data processing network corresponding to the channel in the attention network; a second determining sub unit, configured for determining whether a difference between the first number and the second number is greater than or equal to a preset minimum channel threshold; and the pruning sub unit is further configured for pruning, in a case where the difference is greater than or equal to the preset minimum channel threshold, the channel in the data processing network corresponding to the channel in the attention network.

In a third aspect, the present application illustrates an electronic device, and the electronic device includes: a processor; and a memory, storing executable codes therein which, when executed, cause the processor to perform the data processing method as described in the first aspect.

In a fourth aspect, the present application illustrates one or more machine-readable mediums, storing executable codes therein which, when executed, cause a processor to perform the data processing method as described in the first aspect.

Compared to the prior art, the embodiments of the present application include the following advantages.

In the present application, the model at least includes a data processing network, an attention network and a data aggregation network. Input data is processed based on the data processing network to obtain intermediate data. A fixed attention feature output by the attention network is acquired, and the fixed attention feature is obtained after training the model with at least an initialized attention feature, and respective attention weights included in the initialized attention feature are not all the same. The intermediate data is processed based on the data aggregation network in the model and according to the fixed attention feature to obtain output data. The fixed attention feature output by the attention network is irrelevant to the input data.

In the present application, a softmax network may not be set before the attention network, so that the softmax network may not be used for performing normalization on each local feature in the input data and there will be no situation where each normalized local feature is the same. In the present application, the fixed attention feature output by the attention network is irrelevant to the input data.

Therefore, in the previous process of training the model, the initialized attention feature output by the attention network may affect at least a network parameter of the data processing network and/or a network parameter of the data aggregation network in turn. In addition, the initialized attention feature output by the attention network includes one layer of attention weights, multiple attention weights in the one layer of attention weights are not all the same; or, the initialized attention feature includes at least two layers of attention weights, attention weights of different layers are not all the same. Therefore, the data processing network and/or the data aggregation network may learn the importance of each channel, to improve the modelling ability of the trained model.

For example, the trained model can obtain the importance (value) of each local feature in the input data, so that the model may improve the accuracy of the data result obtained by processing the input data according to the importance (value) of each local feature in the input data.

For example, in the case where the input data is an image, the trained model can obtain the importance (value) of different channels in the image to image classification. Therefore, combining the fixed attention feature may improve image classification accuracy, etc.

DETAILED DESCRIPTION

Figure 1:
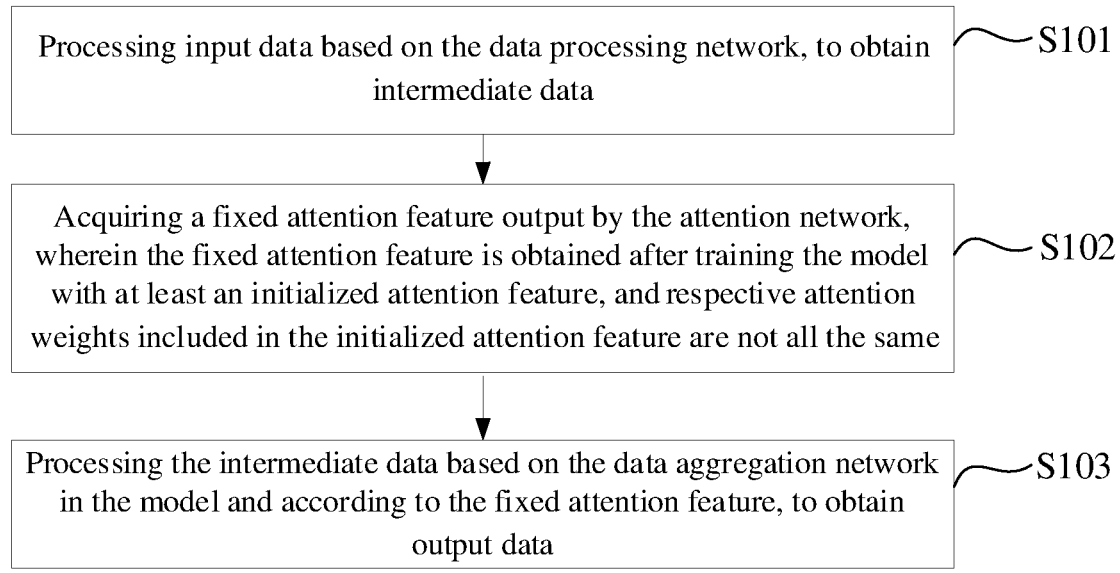
FIG. 1 is a schematic flow chart illustrating a data processing method according to an exemplary embodiment of the present application.

In order to enable the purposes, features and advantages of the present application to become more apparent and easily understood, the present application is described in further detail below in conjunction with the accompanying drawings and detailed descriptions.

In order to improve classification accuracy, in one way, an attention layer may be introduced to a classification model. For example, input features (features of an image) input to a convolutional layer in the classification model may also be input to the attention layer. The attention layer acquires attention features according to the input features, and inputs the attention features to the convolutional layer. The classification model may combine features output by the convolutional layer with the attention features to acquire the classification of the image.

In this way, more local features of the image may be acquired based on the attention layer. For example, the attention features may reflect importance (value) of different regions in the image to image classification and importance (value) of different channels in the image to image classification. Therefore, more features of the image may be obtained by combining local features of the image and global features of the image, and classification accuracy of the image may be improved according to the more features of the image.

However, in this way, the attention features are obtained by the attention layer according to input features (features of an image), that is, there is a strong correlation between the attention features output by the attention layer and the features of the image.

While in some situations, for example, some normalization layers are set before the attention layer, to normalize different local features in the input features (such as Instance Normalization, etc.). After normalization, different local features in the input features sometimes may be the same, and for the attention layer, it cannot learn the importance (value) of local features to image classification when facing respective identical local features. Thus, there is no difference between each attention weight in attention features output by the attention layer according to the normalized input features. Therefore, the attention layer cannot determine the importance (value) of different regions in the image to image classification and importance (value) of different channels in the image to image classification, and then the attention features output by the attention layer cannot reflect the importance (value) of different regions in the image to image classification and importance (value) of different channels in the image to image classification.

For example, assume that input data is an image, a classification model needs to be used to classify the image. A feature matrix of the image is a three-dimensional matrix, and the three-dimensional matrix includes multiple two-dimensional matrices. Each two-dimensional matrix corresponds to a different channel, such as R (Red) channel, G (Green) channel, B (Blue) channel, etc. Before the attention layer processes the three-dimensional matrix, for any two-dimensional matrix included in the three-dimensional matrix, an average value of respective values in the two-dimensional matrix may be computed, and the average value is used to replace the respective values in the two-dimensional matrix, to obtain the normalized two-dimensional matrix. For each of other two-dimensional matrices included in the three-dimensional matrix, the foregoing operations are also performed, thereby obtaining each normalized two-dimensional matrix. Then the attention layer processes the three-dimensional matrix composed of each normalized two-dimensional matrix, to obtain the attention features.

However, sometimes the value (average value) in different two-dimensional matrices after normalization is the same, which may cause the attention layer unable to learn importance (value) of respective channels to image classification when facing two-dimensional matrices with the same value. Therefore, there is no difference between attention weights corresponding to respective channels in the attention features output by the attention layer according to all the normalized two-dimensional matrices.

Therefore, the attention layer cannot determine the importance (value) of different channels in the image to image classification, so that the attention features output by the attention layer cannot reflect the importance (value) of different channels in the image to image classification.

It can be seen that in these situations, the attention layer still does not make much contribution to image classification, which causes relatively low image classification accuracy.

Therefore, in order to at least improve classification accuracy, FIG. 1 illustrates a schematic flow chart of a data processing method of the present application, and the method is applied to an electronic device.

The electronic device may include a front-end device or a back-end device, etc. The front-end device may include devices which may be directly controlled by a number of users, such as mobile phones, tablet computers, laptop computers, desktop computers, smart watches and smart glasses, etc. The back-end device may include various devices which are directly controlled by a service provider and are not directly controlled by a user, such as back-end servers or cloud ends, etc.

The method is applied to a model, and the model at least includes a data processing network, an attention network and a data aggregation network. Referring to FIG. 1, the method may include following steps.

At step S101, processing input data based on the data processing network, to obtain intermediate data.

In the present application, the model includes: CNN, RNN (Recurrent Neural Network), LSTM (Long Short-Term Memory), etc. Models of other structures may also be included, which are not limited in the present application and will not be exemplified one by one.

The model in the present application may be used to identify a target object in an image, classify an image, perform semantic recognition on text, perform semantic recognition on voice, screen a commodity that a user is interested in among multiple commodities according to the obtained user's information, etc. The model may also be used in other feasible scenarios, which is not limited in the present application and will not be exemplified one by one.

In the present application, the data processing network may include at least one convolutional layer, at least one pooling layer, at least one activation function, at least one fully connected layer, etc. It may also be that the data processing network includes at least one of the following: at least one convolutional layer, at least one pooling layer, at least one activation function, at least one fully connected layer, etc. The present application does not limit the type and number of network layers included in the data processing network, which may be determined according to actual situations.

In the present application, the data processing network is used for computing the input data, to obtain the intermediate data. The specific computation mode may be determined by the network layer included in the data processing network.

The input data may include an image, a video, an audio, text, etc., which may be determined according to actual application scenarios, and is not limited in the present application.

The convolutional layer may extract different features of data via a convolutional operation. A shallow convolutional layer may extract low level features such as edges or lines, etc. A deep convolutional layer may extract high level features.

The pooling layer may be located after the convolutional layer and is used for performing a pooling operation on a local receptive field to acquire features with spatial invariance.

The fully connected layer is usually located after the convolutional layer, pooling layer and activation function, and is used for integrating class-discriminative features in the convolutional layer, pooling layer and activation function.

The data processing network may also include a network layer with other functions, such as softmax network, etc., which is not limited in the present application and will not be exemplified one by one.

In the present application, a model may be trained in advance. After the model is trained, the model may be deployed online for application. After receiving online input data, the input data may be processed according to the process of the present application by means of the model.

Figure 2:
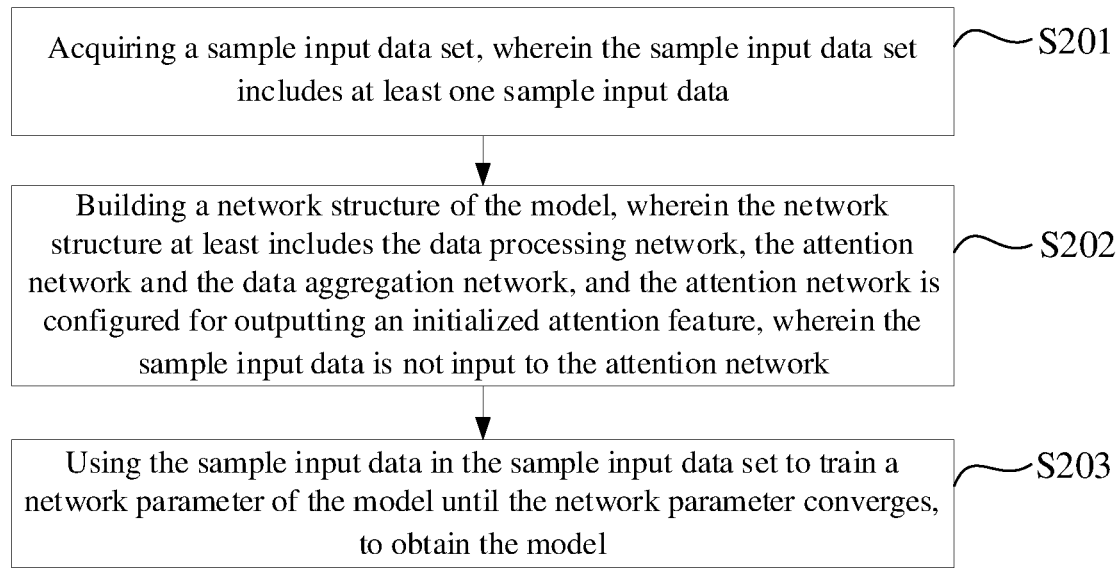
FIG. 2 is a schematic flow chart illustrating a model training method according to an exemplary embodiment of the present application.

A detailed training process of the model may refer to an embodiment illustrated by FIG. 2, which is not elaborated herein.

At step S102, acquiring a fixed attention feature output by the attention network, wherein the fixed attention feature is obtained after training the model with at least an initialized attention feature, and respective attention weights included in the initialized attention feature are not all the same.

In one possible situation, the fixed attention feature includes one layer of attention weights, and multiple attention weights included in the one layer of attention weights may not be all the same; different attention weights included in the one layer of attention weights are respectively used for processing different local features of the input data.

Optionally, in another possible situation, the fixed attention feature includes at least two layers of attention weights, and attention weights of different layers may not be all the same. Attention weights of different layers are respectively used for processing different local features of the input data.

In the present application, the model at least includes the data processing network, the attention network and the data aggregation network. Other networks may also be set in the model according to actual requirements, which is not limited in the present application.

The present application takes the model including the data processing network, the attention network and the data aggregation network as an example for illustration, which is not intended to limit the scope of the present application.

In the present application, the attention feature output by the attention network may be fixed and is irrelevant to the input data. In other words, the attention feature output by the attention network is irrelevant to the input data that the model needs to process currently. That is, the attention feature output by the attention network does not change with the change of the input data needs to be processed by the model.

For example, in a case where the model respectively processes different input data, the attention feature output by the attention network in the model is all fixed.

The attention feature output by the attention network in the model is determined in the process of training the model in advance. For example, after the model is trained in advance, the attention feature output by the attention network may be fixed. In this way, after the model is launched, the attention network may output a fixed attention feature.

In another embodiment of the present application, after the model is launched, if some data needs to be used to update the model according to actual requirements, then after the model is updated, the attention feature output by the attention network in the model may change, that is, which may be different from the previously output attention feature. If there is a change, the attention network may output a changed attention feature every time it needs to output the attention feature.

The present application does not limit the execution sequence between step S101 and step S102. Step S101 may be executed first and then step S102 is executed, or, step S102 may be executed first and then step S101 is executed, or, step S101 and step S102 are executed simultaneously.

At S103, processing the intermediate data based on the data aggregation network in the model and according to the fixed attention feature, to obtain output data.

In an embodiment of the present application, the data aggregation network may include a Scale function which is used for calculating the product between two data, for example, which is used for calculating the product between the fixed attention feature output by the attention network and the intermediate data output by the data processing network.

For example, in one example, assume that the model is used for image classification, and input data is an image. The data processing network may acquire a feature matrix (three-dimensional matrix) of H*W*C structure (dimension) according to the image.

H is the height of the image (the number of pixels included in a column in the image), W is the width of the image (the number of pixels included in a row in the image) and C is the number of color channels included in the image.

After the data processing network processes the feature matrix of H*W*C structure (dimension), data of an intermediate feature layer of H*W*C structure is obtained. The attention network outputs the attention feature of 1*1*C structure and there are multiple attention weights on the "C" dimension of the attention feature. Each attention weight respectively corresponds to a different channel of a corresponding feature layer, such as R (Red) channel, G (Green) channel, B (Blue) channel, etc.

In this way, when the intermediate data is processed according to the fixed attention feature, it is possible to emphasize a two-dimensional matrix of H*W structure for a channel with higher value among the two-dimensional matrices of H*W structure (dimension) for C different channels in the intermediate data of H*W*C structure. That is, the two-dimensional matrix of H*W structure for a channel with higher importance (value) to image classification is emphasized, thereby improving classification accuracy.

In the present application, the model at least includes the data processing network, the attention network and the data aggregation network. The input data is processed based on the data processing network to obtain the intermediate data. The fixed attention feature output by the attention network is acquired, and the fixed attention feature is obtained after training the model with at least an initialized attention feature, and respective attention weights included in the initialized attention feature are not all the same. The intermediate data is processed based on the data aggregation network in the model and according to the fixed attention feature to obtain output data. The fixed attention feature output by the attention network is irrelevant to the input data.

In the present application, a softmax network may not be set before the attention network, so that the softmax network may not be used for performing normalization processing on respective local features in the input data and there will be no situation where respective normalized local features are the same. In the present application, the fixed attention feature output by the attention network is irrelevant to the input data.

Therefore, in the previous process of training the model, the initialized attention feature output by the attention network may affect at least a network parameter of the data processing network and/or a network parameter of the data aggregation network in turn. In addition, because the initialized attention feature output by the attention network includes one layer of attention weights, multiple attention weights in the one layer of attention weights are not all the same; or, the initialized attention feature includes at least two layers of attention weights, attention weights of different layers are not all the same. Therefore, the data processing network and/or the data aggregation network may learn the importance of each channel, to improve the modelling ability of the trained model.

For example, the trained model may obtain the importance (value) of each local feature in the input data, so that the model may improve the accuracy of the data result obtained by processing the input data according to the importance (value) of each local feature in the input data.

For example, in the case where the input data is an image, the trained model may obtain the importance (value) of different channels in the image to image classification. Therefore, combining the fixed attention feature may improve image classification accuracy, etc.

In an embodiment of the present application, referring to FIG. 2, the process of training a model includes following steps.

At step S201, acquiring a sample input data set, wherein the sample input data set includes at least one sample input data.

The sample input data may include: an image, a video, an audio, text, etc., which may be specifically determined according to actual application scenarios and is not limited in the present application.

In one possible situation, the sample input data set may also include labeled data of the sample input data, and the labeled data may be determined according to an actual application of the model. For example, assume that the model is used for identifying a target object in an image, then the sample input data may be the image and the labeled data of image is the target object in the image. For another example, assume that the model is used for image classification, then the sample input data may be an image and the labeled data of the image is the category of the image. For another example, assume that the model is used for screening a commodity that a user is interested in among multiple commodities according to the obtained user's information, etc., then the sample input data may be the user's information and the labeled data of the user's information is the commodity that the user is interested in.

At step S202, building a network structure of the model, wherein the network structure at least includes the data processing network, the attention network and the data aggregation network, and the attention network is configured for outputting an initialized attention feature, wherein the sample input data is not input to the attention network.

In an embodiment of the present application, the input end of the model includes the input end of the data processing network. The output end of the data processing network is connected to the input end of the data aggregation network. The output end of the attention network is connected to the input end of the data aggregation network. The output end of the model includes the output end of the data aggregation network.

Specifically, the data processing network is used for acquiring the sample input data and processing the sample input data, to obtain sample intermediate data. The attention network is used for outputting the initialized attention feature, and the initialized attention feature includes one layer of attention weights, and multiple attention weights in the one layer of attention weights are not all the same; or, the initialized attention feature includes at least two layers of attention weights and attention weights of different layers are not all the same. The data aggregation network is used for processing the sample intermediate data according to the initialized attention feature output by the attention network, to obtain a sample output result.

An example is used for illustrating the network structure of the model, but it is not intended to limit the protection scope of the present application.

Figure 3:
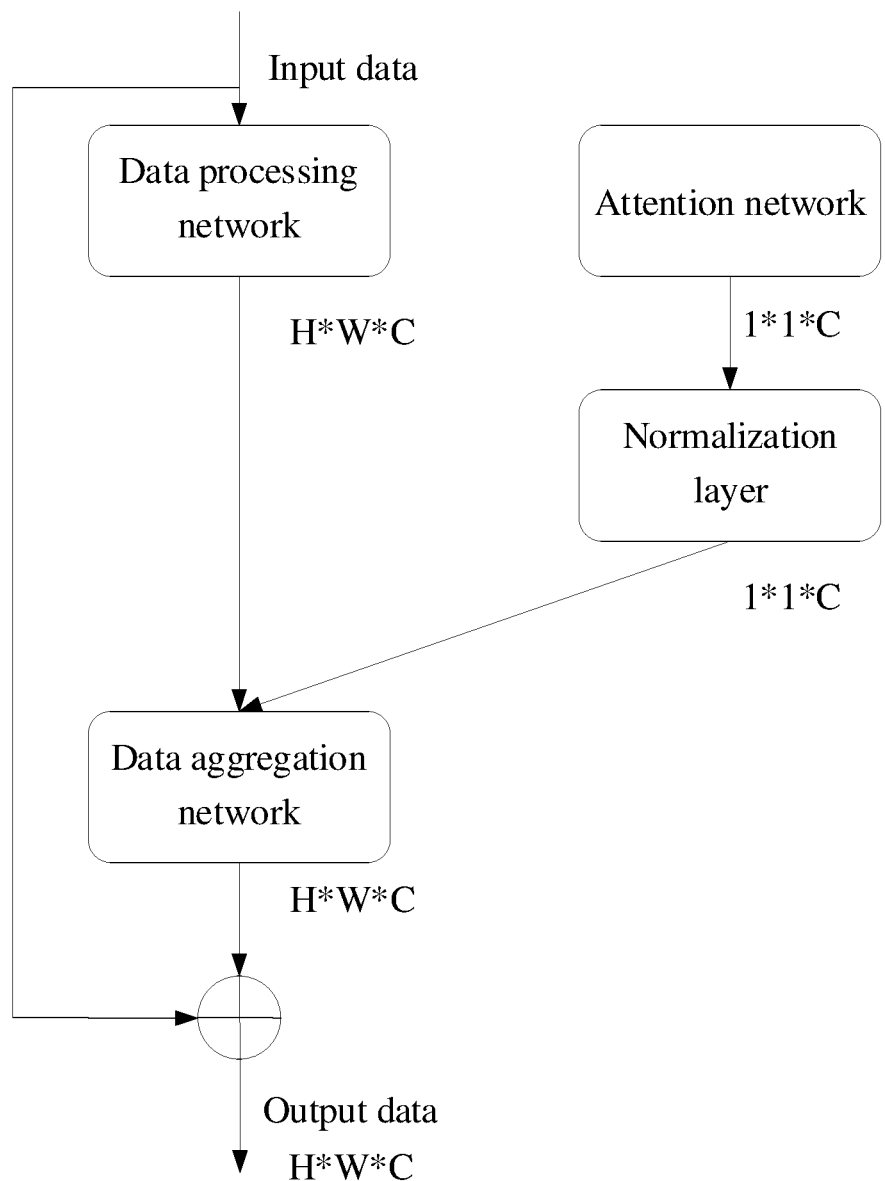
FIG. 3 is a schematic structural diagram illustrating a model according to an exemplary embodiment of the present application.

For example, referring to FIG. 3, the model includes the data processing network, attention network, softmax network, data aggregation network. The data processing network includes a residual network and the residual network may include a convolutional layer, etc. Other network layers may be included and will not be exemplified one by one.

Specifically, the output end of the attention network is connected to the input end of the softmax network. The output end of the softmax network is connected to the input end of the data aggregation network. The output end of the data processing network is connected to the input end of the data aggregation network. The output end of the data aggregation network is connected to the input end of a fully connected layer. The output end of the fully connected layer is the output end of the model. The input end of the model includes the input end of the data processing network and the input end of the fully connected layer, that is, the input data may be respectively input to the data processing network and the fully connected layer. The fully connected layer is used for superimposing the input data and the data output by the data aggregation network (such as adding two feature matrices, etc.), to obtain an output result.

The softmax network includes a sigmoid function, etc., which is used for normalizing the attention weights in the attention feature output by the attention network to a specific interval, which is convenient for subsequent computations. The specific interval includes (0, 1), etc. The present application does not limit the specific interval.

For example, in one example, assume that the model is used for image classification, and input data is an image. The data processing network may acquire a feature matrix (three-dimensional matrix) of H*W*C structure (dimension) according to the image.

H is the height of the image (the number of pixels included in a column in the image), W is the width of the image (the number of pixels included in a row in the image) and C is the number of color channels included in the image.

After the data processing network processes the feature matrix of H*W*C structure (dimension), intermediate data of H*W*C structure is obtained and input to the data aggregation network.

The attention network outputs an attention feature of 1*1*C structure, which is input to the data aggregation network.

There are multiple attention weights on the "C" dimension of the attention feature and respective attention weights are not all the same. Respective attention weights correspond to different channels of the image, such as R (Red) channel, G (Green) channel, B (Blue) channel, etc.

The data aggregation network multiplies the feature matrix of H*W*C structure (dimension) by the attention feature of 1*1*C structure, to obtain a feature matrix of H*W*C structure (dimension) which is input to the fully connected layer.

The input data is also input to the fully connected layer. Therefore, the fully connected layer may obtain the original feature matrix of H*W*C structure (dimension) of the image, and superimpose it with the feature matrix of H*W*C structure (dimension) output by the data aggregation network, to obtain the output data of H*W*C structure (dimension). The way of superimposition may be the addition of data at the same position in the feature matrices, etc.

At step S203, using the sample input data in the sample input data set to train a network parameter of the model until the network parameter converges, to obtain the model.

After the network structure of the model is built, the network parameter of the model may be trained according to the sample input data set.

In the training process, the sample input data may be input to the model, to cause the data processing network in the model to process the sample input data, to obtain the sample intermediate data and input it to the data aggregation network. Then the initialized attention feature output by the attention network in the model is given to the softmax network. The softmax network normalizes each attention weight in the attention feature to a specific interval and inputs the normalized attention feature to the data aggregation network. The initialized attention feature output by the attention network is irrelevant to the sample input data, which may be an attention feature manually set by a developer, etc. Then the data aggregation network in the model may process the sample intermediate data according to the normalized attention feature to obtain a processing result, and input the processing result to the fully connected layer. The sample input data may also be input to the fully connected layer. The fully connected layer may superimpose the sample input data and the processing result data output by the data aggregation network (such as adding two feature matrices, etc.), to obtain the sample output result.

Then the network parameter of the model may be optimized by means of a loss function (such as a cross entropy loss function, etc.) and based on the sample output data (the network parameter of the model may also be optimized by means of labelled data of the sample input data). For example, the network parameter of each network layer in the data processing network is optimized, the network parameter of the data aggregation network is optimized, and the attention network is optimized to change the attention feature output by the attention network later, that is, the attention feature output by the attention network later may not be the initialized attention feature. After at least one round of training, the training may be completed until the network parameter of the model converges, and the obtained model may be used online.

Gradient optimization algorithms such as ADAM (Adaptive Moment Estimation), etc. may be used when optimizing the network parameter. The present application does not limit the specific optimization algorithms.

Therefore, in the process of training the model, the initialized attention feature output by the attention network may at least affect the network parameter of the data aggregation network and/or the network parameter of the data processing network in turn. In addition, the initialized attention feature output by the attention network includes one layer of attention weights and multiple attention weights in the one layer of attention weights are not all the same; or, the initialized attention feature includes at least two layers of attention weights and attention weights of different layers are not all the same. Therefore, the data processing network and/or the data aggregation network may learn the importance of each channel, to improve the modelling ability of the trained model.

For example, the trained model may obtain the importance (value) of each local feature in the input data, so that the model may improve the accuracy of the data result obtained by processing the input data according to the importance (value) of each local feature in the input data.

For example, in the case where the input data is an image, the trained model can obtain the importance (value) of different channels in the image to image classification. Therefore, combining the fixed attention feature may improve image classification accuracy, etc.

In the present application, some network layers included in the data processing network in the model includes multiple channels. For example, the convolutional layer may include multiple channels and the fully connected layer may also include multiple channels, etc. Different channels play different roles in the process of training the input data. For example, some channels play a more important role in the process of training the input data. For example, some channels play a more important role in improving the accuracy of output data while some other channels play a less important role in the process of processing input data. For example, some other channels play a less important role in improving the accuracy of output data.

It can be seen that in this situation, parameters of the data processing network in the model are relatively redundant. Loading the model in an electronic device needs to take up more system resources of the electronic device, and running the model in the electronic device needs to take up more computing resources of the electronic device. In addition, because the parameters of the data processing network in the model are redundant and the model usually needs to use all network parameters when processing data, the efficiency of processing data by the data processing network in the model may be lower.

Therefore, in order to save the system resources and computing resources of the electric device, and improve the efficiency of processing data by the data processing network in the model, in another embodiment of the present application, after starting to train the network parameter of the model, the model may be compressed.

For example, after starting to train the network parameter of the model, the channels in the data processing network may be pruned according to the attention network. For the specific channel to be pruned, reference may be made to the embodiments shown later.

Figure 4:
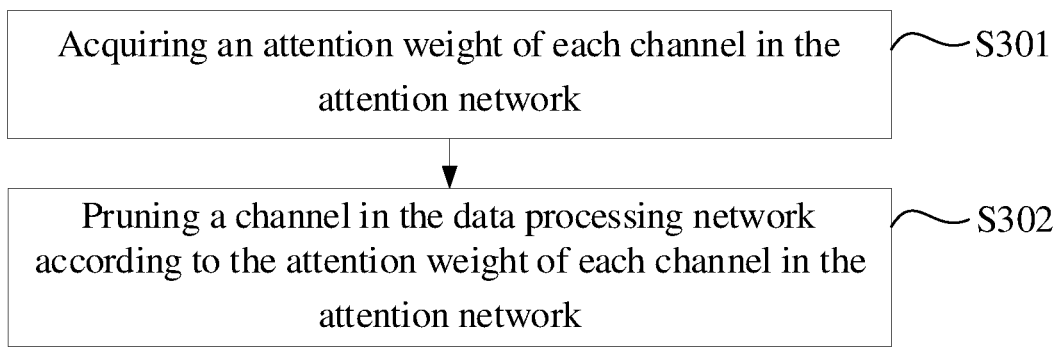
FIG. 4 is a schematic flow chart illustrating a model pruning method according to an exemplary embodiment of the present application.

Specifically, in an embodiment of the present application, referring to FIG. 4, pruning the channels in the data processing network according to the attention network includes following steps.

At step S301, acquiring an attention weight of each channel in the attention network.

In the process of training the model, for each round of training, the model processes the sample input data to obtain the sample output data, then the loss function compares the sample output data with the sample input data and feed back the comparison processing result to the attention network to optimize the attention weights of the attention network. After multiple rounds of training, the attention weights of the attention network may be continuously optimized until the network parameter of the model is determined to converge by the loss function, and the training is completed. At this time, the attention weight of each channel in the attention network has been determined. Therefore, the attention weight of each channel may be directly acquired from the attention network, such as the attention weight of R channel, the attention weight of G channel, the attention weight of B channel, etc.

At step S302, pruning the channels in the data processing network according to the attention weight of each channel in the attention network.

For example, in the present application, after staring to train the network parameter of the model, it may detect that whether the network parameter of the model converges in real time or periodically.

In the case where the network parameter of the model converges, it means that the network parameter of the model has tended to be stable, then the network parameter of the model may no longer be optimized, so that the channels in the data processing network may be pruned according to the attention network.

In the case where the network parameter of the model does not converge, it means that the network parameter of the model does not tend to be stable, then the network parameter of the model may still be optimized. Thus, the channels in the data processing network may not be pruned firstly according to the attention network, and the model may be continued training. For example, the network parameter of the model is continued optimizing until the network parameter of the model converges, then the channels in the data processing network are started to be pruned according to the attention network.

If the channels in the data processing network are pruned according to the attention network in the process of training the model, because the network parameter of the model does not tend to be stable in the process of training the model, for example, the attention weights in the attention network do not tend to be stable, etc., there may be a case where a channel in the data processing network that should not be pruned is pruned, which leads to a situation of wrong prune and bring loss to the model.

While in the embodiments of the present application, the channels in the data processing network in the model are pruned after the model training is completed, which may improve the accuracy of channel prune, to avoid loss to the model.

Through the embodiments of the present application, the channels in the data processing network in the model are pruned by the attention network, to simplify the channels in the data processing network in the model. Because a channel includes at least one network parameter, the network parameters in the data processing network in the model are reduced, and thus the system resources of the electronic device taken up for loading the model in the electronic device are reduced. Accordingly, the computing resources of the electronic device taken up for running the model in the electronic device are reduced, and the efficiency of processing data by the data processing network in the model is improved.

Figure 5:
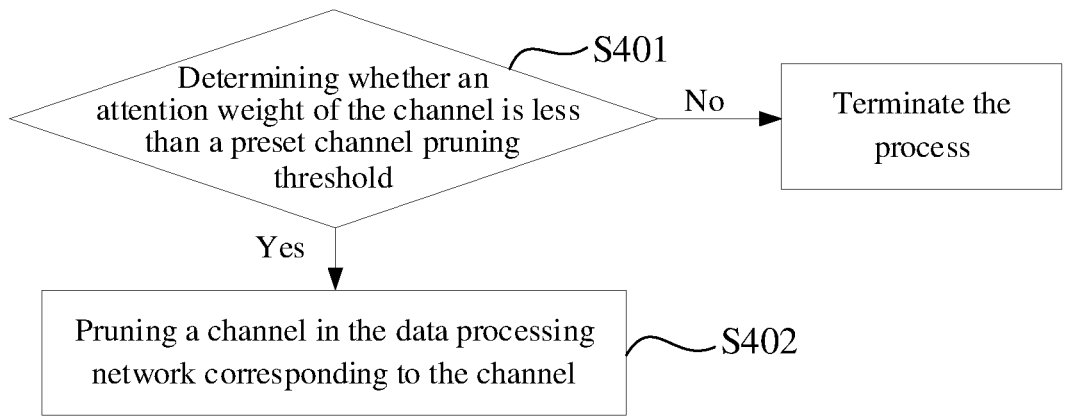
FIG. 5 is a schematic flow chart illustrating a model pruning method according to an exemplary embodiment of the present application.
Figure 6:
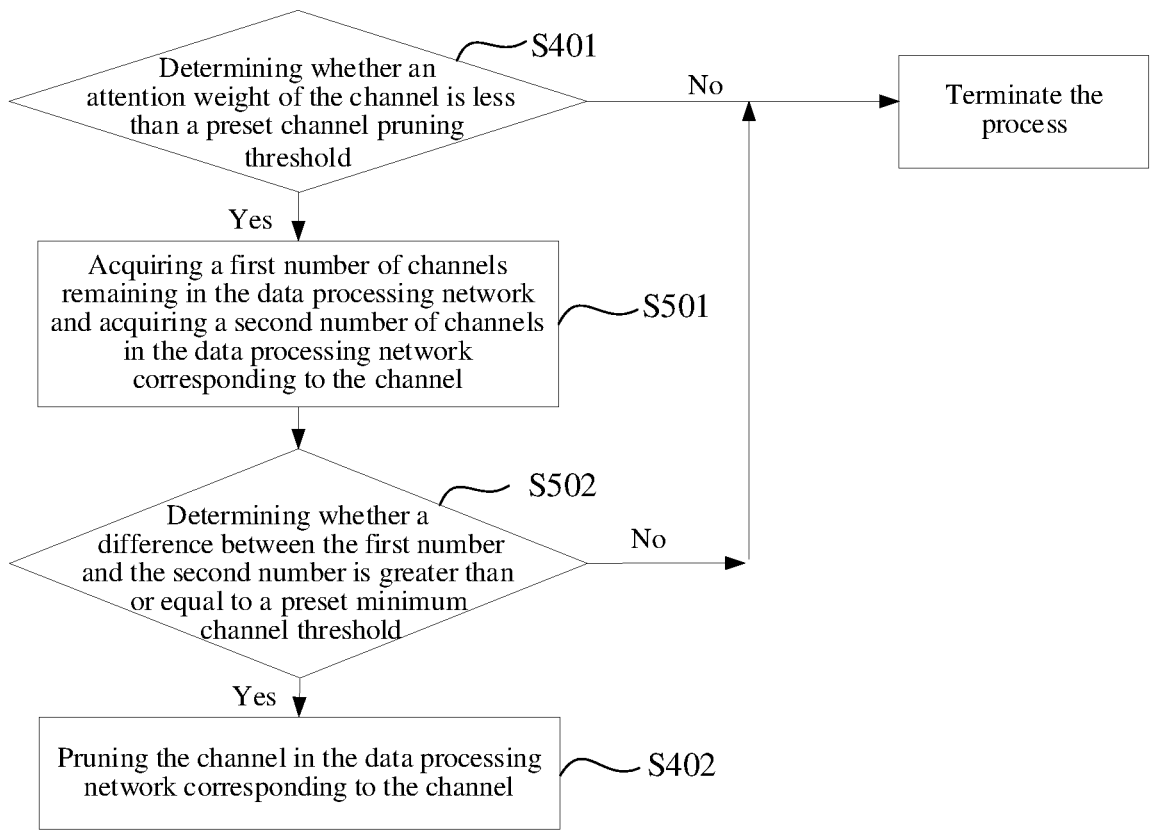
FIG. 6 is a schematic flow chart illustrating a model pruning method according to an exemplary embodiment of the present application.

In an embodiment of the present application, for any one channel in the attention network, the channels in the data processing network may be pruned according to the attention weight corresponding to this channel in the attention network in a way as shown in FIG. 5 below. The same method is applied to every other channel in the attention network.

For example, one channel may be selected form multiple channels in the attention network, then the channels in the data processing network are pruned according to the attention weight of this channel in the attention network as shown in FIG. 5 below. Then another channel is selected form multiple channels in the attention network, and the channels in the data processing network are pruned according to the attention weight of this another channel in the attention network as shown in FIG. 5 below, and so on, until the above operation is performed on each channel in the attention network.

When a channel is selected from multiple channels in the attention network in each round, the multiple channels in the attention network may be sorted in order of their respective attention weights form low to high, and a channel is selected according to the sorted order. For example, a channel with the lowest attention weight is selected for the first time, a channel with the second lowest attention weight is selected for the second time, and so on.

Referring to FIG. 5, at step S302, the following process may be performed for any one channel in the attention network, and the same process is applied to every other channel in the attention network.

The specific process includes following steps.

At step S401, determining whether an attention weight of the channel is less than a preset channel pruning threshold.

In the present application, the preset channel pruning threshold may be set in advance. For example, assume that the range of the attention weights lies in the interval (0, 1), then the preset channel pruning threshold may be set to a value within the interval (0, 1), such as 0.05, 0.1 or 0.15, etc., which may be specifically set according to actual situations, and is not limited in the present application.

In an embodiment, the data processing network in the model may include multiple channels, the attention network in the model may include multiple channels. Each channel in the attention network corresponds to at least one channel in the data processing network, and the channels in the data processing network corresponding to different channels in the attention network may not overlap.

In an example, the number of channels in the data processing network is the same as the number of channels in the attention network, then there is a one-to-one correspondence between the channels in the data processing network and the channels in the attention network.

In a case where the attention weight of the channel is less than the preset channel pruning threshold, at step S402, pruning the channel in the data processing network corresponding to this channel.

In the embodiments, the channels in the data processing network in the model are pruned by referring to the comparison between the attention weight of each channel in the attention network and the preset channel pruning threshold, which may avoid pruning important channels in the data processing network in the model, improve the accuracy of pruning and realize the precise compression of the model.

However, if too many channels in the data processing network in the model are pruned, it may cause too much channel loss in the model and affect the performance of the model.

Therefore, in order to avoid too much channel loss in the model and affecting the performance of the model, in an embodiment of the present application, the channel in the data processing network corresponding to one or more channels with the lowest attention weight may be pruned, to avoid pruning too many channels in the data processing network in the model, and avoid too much channel loss in the data processing network in the model and affecting the performance of the model. Therefore, the preset channel pruning threshold may be set to a smaller value, etc.

Optionally, in another embodiment of the present application, on the basis of the embodiment shown in FIG. 5, the method also includes the following steps.

In a case where the attention weight of the channel in the attention network is less than the preset channel pruning threshold, at step S501, acquiring a first number of channels remaining in the data processing network and acquiring a second number of channels in the data processing network corresponding to the channel in the attention network.

At step S502, determining whether a difference between the first number and the second number is greater than or equal to a preset minimum channel threshold.

In an embodiment of the present application, the number of channels included in the data processing network in the model may be determined when constructing the network structure of the model. After the number of channels included in the data processing network in the model is determined, the preset minimum channel threshold may be set, and the preset minimum channel threshold is less than the number of channels included in the data processing network in the model.

For example, the preset minimum channel threshold may be set manually based on experiences. In one example, assume the number of channels included in the data processing network in the model is 128, then the preset minimum channel threshold may be set less than 128, such as 125, 120, 115 or 110, etc., which may be determined according to actual situations, and is not limited in the present application.

In a case where the difference is greater than or equal to the preset minimum channel threshold, step S402 is executed: pruning the channel in the data processing network corresponding to the channel.

In a case where the difference is less than the preset minimum channel threshold, step S402 may not be executed and the pruning process may terminate.

In the present application, whether to prune a channel is determined according to whether the difference between the first number and the second number is greater than or equal to the preset minimum channel threshold. In addition, pruning is not performed when the difference is less than the preset minimum channel threshold, that is, pruning is not performed when the number of current channels is the minimum, thereby avoiding pruning too many channels in the data process network in the model, and avoiding too much channel loss in the data process network in the model to affect the performance of the model.

Figure 7:
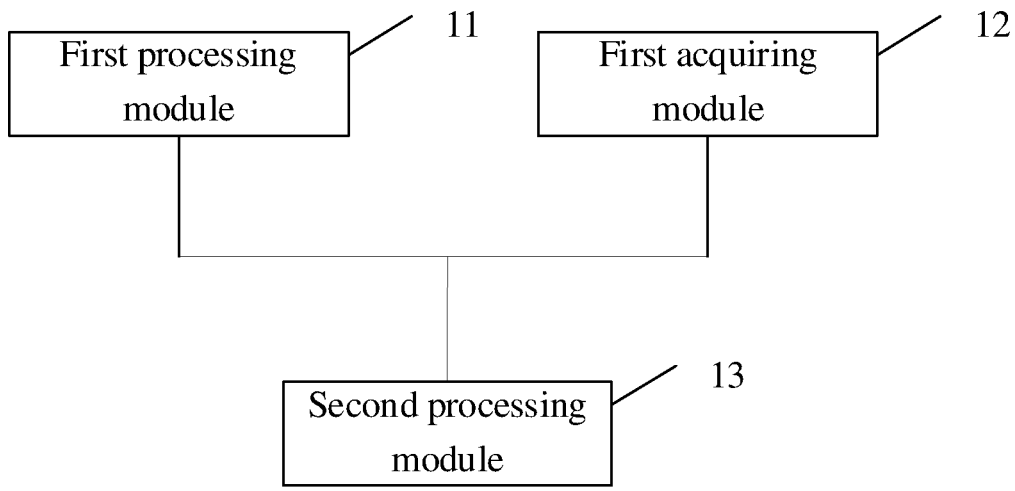
FIG. 7 is a structural diagram illustrating a data processing apparatus according to an exemplary embodiment of the present application.

FIG. 7 is a structural diagram illustrating an embodiment of a data processing apparatus of the present application, the data processing apparatus is applied to a model, and the model at least includes a data processing network, an attention network and a data aggregation network, and the apparatus may specifically include the following modules: a first processing module 11, configured for processing input data based on the data processing network, to obtain intermediate data; a first acquiring module 12, configured for acquiring a fixed attention feature output by the attention network, wherein the fixed attention feature is obtained after training the model with at least an initialized attention feature, and respective attention weights included in the initialized attention feature are not all the same; and a second processing module 13, configured for processing the intermediate data based on the data aggregation network in the model and according to the fixed attention feature, to obtain output data.

In an optional implementation, the initialized attention feature includes one layer of attention weights and a plurality of attention weights in the one layer of attention weights are not all the same; or, the initialized attention feature includes at least two layers of attention weights and attention weights of different layers are not all the same.

In an optional implementation, the apparatus further includes: a second acquiring module, configured for acquiring a sample input data set, wherein the sample input data set includes at least one sample input data; a building module, configured for building a network structure of the model, wherein the network structure at least includes the data processing network, the attention network and the data aggregation network, and the attention network is configured for outputting an attention feature, and wherein the sample input data is not input to the attention network; and a training module, configured for using the sample input data in the sample input data set to train a network parameter of the model until the network parameter converges, to obtain the model.

In an optional implementation, the data processing network is configured for acquiring the sample input data and processing the sample input data, to obtain sample intermediate data; the attention network is configured for outputting an attention feature and the output attention feature includes multiple attention weights; and the data aggregation network is configured for processing the sample intermediate data according to the attention feature output by the attention network, to obtain a sample output result.

In an optional implementation, an input end of the model includes an input end of the data processing network; an output end of the data processing network is connected to an input end of the data aggregation network; an output end of the attention network is connected to the input end of the data aggregation network; and an output end of the model includes an output end of the data aggregation network.

In an optional implementation, the apparatus further includes: a pruning module, configured for pruning, after starting to train the network parameter of the model, a channel in the data processing network according to the attention network.

In an optional implementation, the pruning module includes: an acquiring unit, configured for acquiring an attention weight of each channel in the attention network; and a pruning unit, configured for pruning the channel in the data processing network according to the attention weight.

In an optional implementation, the pruning unit includes: a first determining sub unit, configured for determining, for any one channel in the attention network, whether the attention weight of the channel in the attention network is less than a preset channel pruning threshold; and a pruning sub unit, configured for pruning, in a case where the attention weight of the channel in the attention network is less than the preset channel pruning threshold, a channel in the data processing network corresponding to the channel in the attention network.

In an optional implementation, the pruning unit further includes: an acquiring sub unit, configured for acquiring, in a case where the attention weight of the channel in the attention network is less than the preset channel pruning threshold, a first number of channels remaining in the data processing network, and acquiring a second number of channels in the data processing network corresponding to the channel in the attention network; a second determining sub unit, configured for determining whether a difference between the first number and the second number is greater than or equal to a preset minimum channel threshold; and the pruning sub unit is further configured for pruning, in a case where the difference is greater than or equal to the preset minimum channel threshold, pruning a channel in the data processing network corresponding to the channel in the attention network.

In a third aspect, the present application illustrates an electronic device, and the electronic device includes: a processor; and a memory, storing executable codes therein which, when executed, cause the processor to perform the data processing method as described in the first aspect.

In a fourth aspect, the present application illustrates one or more computer-readable storage mediums, storing executable codes therein which, when executed, cause a processor to perform the data processing method as described in the first aspect.

Compared to the prior art, the embodiments of the present application include the following advantages.

In the present application, the model at least includes a data processing network, an attention network and a data aggregation network. Input data is processed based on the data processing network to obtain intermediate data. A fixed attention feature output by the attention network is acquired, and the fixed attention feature is obtained after training the model with at least an initialized attention feature, and respective attention weights included in the initialized attention feature are not all the same. The intermediate data is processed based on the data aggregation network in the model and according to the fixed attention feature to obtain output data. The fixed attention feature output by the attention network is irrelevant to the input data.

In the present application, a softmax network may not be set before the attention network, so that the softmax network may not be used for performing normalization on each local feature in the input data and there will be no situation where each normalized local feature is the same. In the present application, the fixed attention feature output by the attention network is irrelevant to the input data.

Therefore, in the previous process of training the model, the initialized attention feature output by the attention network may affect at least a network parameter of the data processing network and/or a network parameter of the data aggregation network in turn. In addition, the initialized attention feature output by the attention network includes one layer of attention weights, multiple attention weights in the one layer of attention weights are not all the same; or, the initialized attention feature includes at least two layers of attention weights, attention weights of different layers are not all the same. Therefore, the data processing network and/or the data aggregation network may learn the importance of each channel, to improve the modelling ability of the trained model.

For example, the trained model can obtain the importance (value) of each local feature in the input data, so that the model may improve the accuracy of the data result obtained by processing the input data according to the importance (value) of each local feature in the input data.

For example, in the case where the input data is an image, the trained model can obtain the importance (value) of different channels in the image to image classification. Therefore, combining the fixed attention feature may improve image classification accuracy, etc.

The embodiments of the present application further provide a non-volatile readable storage medium. The storage medium stores one or more modules (programs). When the one or more modules are applied in a device, the device may be enabled to execute instructions for various method steps in the embodiments of the present application.

The embodiments of the present application provide one or more machine-readable storage mediums, storing instructions therein that, when executed by one or more processors, cause an electronic device to perform one or more methods in the foregoing embodiments. In the embodiments of the present application, the electronic device includes devices such as servers, gateways, sub devices, etc., and the sub devices are Internet of Things devices, etc.

The embodiments of the present disclosure can be implemented as an apparatus having a desired configuration using any suitable hardware, firmware, software, or any combination thereof. The apparatus may include servers (cluster), terminal devices such as electronic devices including IoT devices, etc.

Figure 8:
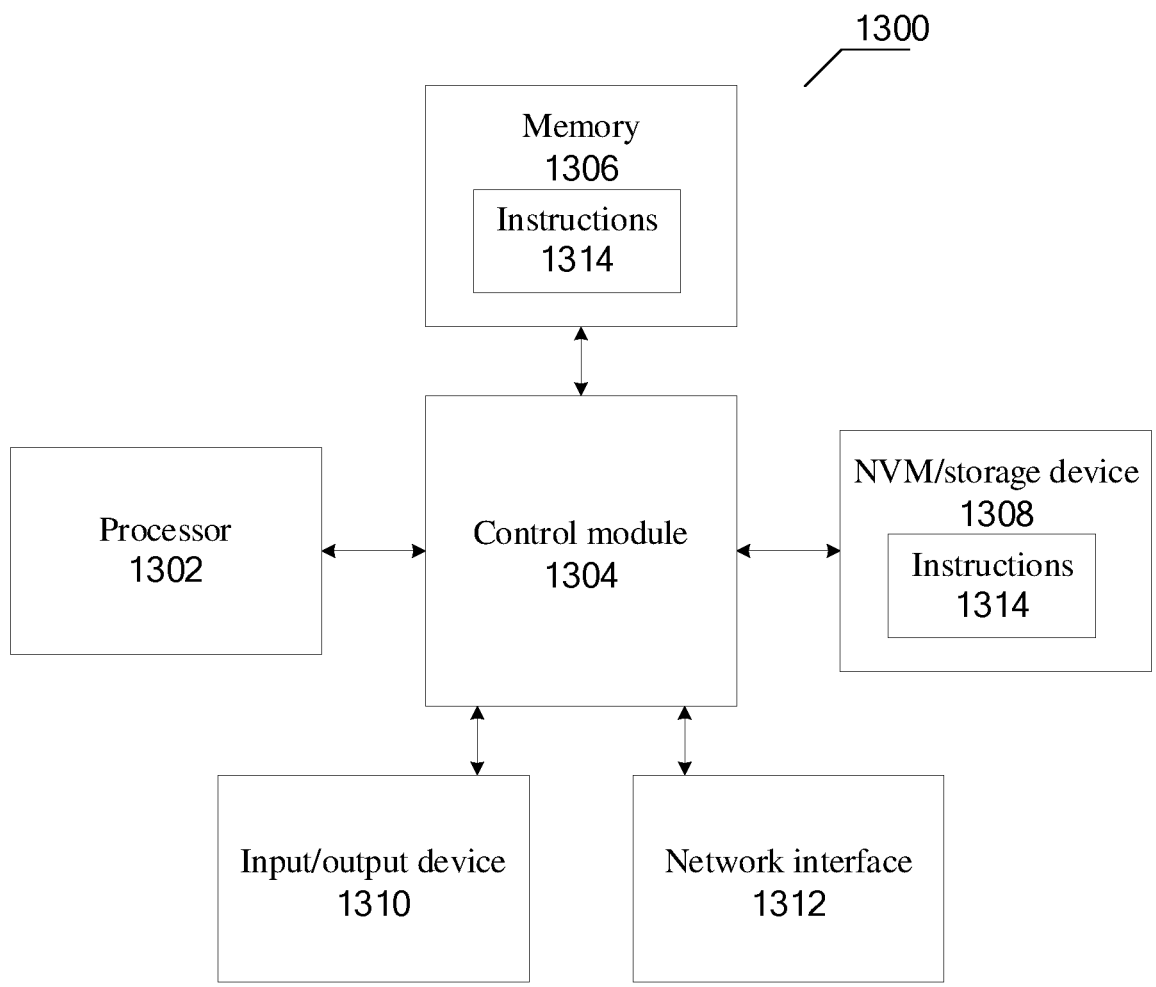
FIG. 8 is a schematic structural diagram of an apparatus provided by an exemplary embodiment of the present application.

FIG. 8 schematically illustrates an exemplary apparatus 1300 that can be used to implement various embodiments described in the present application.

In one embodiment, FIG. 8 illustrates an exemplary apparatus 1300. The apparatus includes one or more processors 1302, at least one control module (chipset) 1304 coupled to at least one of the processor(s) 1302, a memory 1306 coupled to the control module 1304, a non-volatile memory (NVM)/storage device 1308 coupled to the control module 1304, and one or more input/output devices 1310 coupled to the control module 1304, and a network interface 1312 coupled to the control module 1304.

The processor 1302 may include one or more single-core or multi-core processors. The processor 1302 may include any combination of general purpose or special purpose processors (e.g., graphics processors, application processors, baseband processors, etc.). In some embodiments, the apparatus 1300 may function as a server device such as a gateway, etc. as described in the embodiments of the present application.

In some embodiments, the apparatus 1300 may include one or more computer readable mediums (e.g., the memory 1306 or the NVM/storage device 1308) having instructions 1314, and one or more processors 1302 that are configured to execute the instructions 1314 in conjunction with the one or more computer readable mediums to implement the modules and thereby performing the actions described in the disclosure.

For one embodiment, the control module 1304 may include any suitable interface controller to provide any suitable interface to at least one of the processor(s) 1302 and/or any suitable device or component that is in communication with the control module 1304.

The control module 1304 may include a memory controller module to provide an interface to the memory 1306. The memory controller module may be a hardware module, a software module, and/or a firmware module.

The memory 1306 may be configured to load and store data and/or instructions 1314 for the apparatus 1300. For one embodiment, the memory 1306 may include any suitable volatile memory, such as a suitable DRAM. In some embodiments, the memory 1306 may include a double data rate type four synchronous dynamic random access memory (DDR4 SDRAM).

For one embodiment, the control module 1304 may include one or more input/output controllers to provide an interface to the NVM/storage device 1308 and the input/output device(s) 1310.

For example, the NVM/storage device 1308 may be configured to store data and/or instructions 1314. The NVM/storage device 1308 may include any suitable non-volatile memory (e.g., a flash memory) and/or may include any suitable non-volatile storage device(s) (e.g., one or more hard disk drives (HDD), one or more compact disc (CD) drives and/or one or more digital versatile disc (DVD) drives).

The NVM/storage device 1308 may include a storage resource that is physically a part of a device on which the apparatus 1300 is installed, or one that may be accessed by the device without having to be a part of the device. For example, the NVM/storage device 1308 may be accessed through a network via the input/output device(s) 1310.

The input/output device(s) 1310 may provide an interface to the apparatus 1300 to communicate with any other suitable device. The input/output device 1310 may include a communication component, an audio component, a sensor component, etc. The network interface 1312 may provide an interface for the apparatus 1300 to communicate over one or more networks. The apparatus 1300 may conduct wireless communications with one or more components of a wireless network in accordance with any of one or more wireless network standards and/or protocols, for example, by accessing a wireless network based on a communication standard, such as WiFi, 2G, 3G, 4G, 5G, etc., or a combination thereof for conducting wireless communications.

For one embodiment, at least one of the processor(s) 1302 may be packaged with logics of one or more controllers (e.g., memory controller modules) of the control module 1304. For one embodiment, at least one of the processor(s) 1302 may be packaged with the logics of one or more controllers of the control module 1304 to form a system in package (SiP). For one embodiment, at least one of the processor(s) 1302 may be integrated with the logics of one or more controllers of the control module 1304 on a same mold. For one embodiment, at least one of the processor(s) 1302 may be integrated with the logics of one or more controllers of the control module 1304 on a same mold to form a system on a chip (SoC).

In various embodiments, the apparatus 1300 may be, but is not limited to, a server, a desktop computing device, or a mobile computing device (e.g., a laptop computing device, a handheld computing device, a tablet, a netbook, etc.). In various embodiments, the apparatus 1300 may have more or fewer components and/or different architectures. For example, in some embodiments, the apparatus 1300 includes one or more cameras, keyboards, liquid crystal display (LCD) screens (including a touch screen display), non-volatile memory ports, multiple antennas, graphics chips, application specific integrated circuits (ASIC), and speakers.

The embodiments of the present application provide an electronic device, and the electronic device includes: one or more processors; and one or more computer-readable storage mediums storing instructions therein that, when executed by one or more processors, cause the electronic device to perform one or more data processing methods of the present application.

Due to their basically similarities to the method embodiments, the description of the apparatus embodiments is relatively simple, and references can be made to relevant portions of the description of the method embodiments.

The embodiments in this description are all described in a progressive manner. Description of each of the embodiments focuses on differences from other embodiments, and reference may be made to each other for the same or similar parts among respective embodiments.

The embodiments of the present application are described with reference to flowcharts and/or block diagrams of methods, terminal devices (systems), and computer program products according to the embodiments of the present disclosure. It should be understood that each process and/or block in the flowcharts and/or block diagrams, and a combination of the processes and/or blocks in the flowcharts and/or block diagrams may be realized by computer program instructions. These computer program instructions may be provided to a processor of a general-purpose computer, a special-purpose computer, an embedded processor, or other programmable data processing terminal device to generate a machine, so that the instructions executed by the processor of the computer or other programmable data processing terminal device produce an apparatus used for realizing functions specified in one or more processes in the flowcharts and/or one or more blocks in the block diagrams.

These computer program instructions may also be stored in a computer-readable storage device that may guide a computer or other programmable data processing terminal device to operate in a specific manner, so that the instructions stored in the computer-readable storage device produce an article of manufacture that includes an instruction apparatus. Such instruction apparatus implements the functions specified in one or more processes in the flowcharts and/or one or more blocks in the block diagrams.

These computer program instructions may also be loaded into a computer or other programmable data processing terminal device, so that a series of operations are executed in the computer or other programmable terminal device to produce computer-implemented processing, so that the instructions executed in the computer or other programmable terminal device provide steps for implementing the functions specified in one or more processes in the flowcharts and/or one or more blocks in the block diagrams.

Although the preferable embodiments of the embodiments of the present application have been described, one skilled in the art may make additional changes and modifications to these embodiments once learning the basic creative concepts. Therefore, the appended claims are intended to be interpreted as including the preferable embodiments and all the changes and modifications that fall within the scope of the embodiments of the present application.

Finally, it should be noted that in the present application, relational terms such as first and second are only used to distinguish one entity or operation from another entity or operation, and do not necessarily require or imply these entities or operations to have any such actual relationship or sequence therebetween. Moreover, terms "including", "containing" or any other variants thereof are intended to cover a non-exclusive inclusion, so that a process, method, article, or terminal device that includes a series of elements includes not only those elements, but also other elements that are not explicitly listed, or also include elements that are inherent to this process, method, article, or terminal device. Without more restrictions, an element defined by a sentence "including a . . . " does not exclude an existence of other identical elements in a process, method, article, or terminal device that includes such element.

A detailed description of data processing method and apparatus provided by the present application is provided above. Specific examples are used herein to illustrate the principles and implementations of the present application. The description of the above embodiments is only used to help understand the methods and core ideas of the present application. At the same time, for one skilled in the art, there could be changes in specific implementations and scopes of application according to the ideas of the present application. In summary, the contents of this description should not be construed as a limitation to the present application.

What is claimed is:

1. A data processing method applied to a model, wherein the model at least comprises a data processing network, an attention network and a data aggregation network, and the method comprises:
    processing input data based on the data processing network, to obtain intermediate data;
    acquiring a fixed attention feature output by the attention network, wherein the fixed attention feature is obtained after training the model with at least an initialized attention feature, and respective attention weights comprised in the initialized attention feature are not all the same; and
    processing the intermediate data based on the data aggregation network in the model and according to the fixed attention feature, to obtain output data.

2. The method according to claim 1, wherein the initialized attention feature comprises one layer of attention weights, and a plurality of attention weights in the one layer of attention weights are not all the same;
    or,
    the initialized attention feature comprises at least two layers of attention weights, and attention weights of different layers are not all the same.

3. The method according to claim 1, further comprising:
    acquiring a sample input data set, wherein the sample input data set comprises at least one sample input data;
    building a network structure of the model, wherein the network structure at least comprises the data processing network, the attention network and the data aggregation network, and the attention network is configured for outputting an attention feature, and wherein the sample input data is not input to the attention network; and
    using the sample input data in the sample input data set to train a network parameter of the model until the network parameter converges, to obtain the model.

4. The method according to claim 3, wherein the data processing network is configured for acquiring the sample input data and processing the sample input data, to obtain sample intermediate data;
    the attention network is configured for outputting the attention feature and the output attention feature comprises a plurality of attention weights; and
    the data aggregation network is configured for processing the sample intermediate data according to the attention feature output by the attention network, to obtain a sample output result.

5. The method according to claim 3, wherein an input end of the model comprises an input end of the data processing network;
    an output end of the data processing network is connected to an input end of the data aggregation network;
    an output end of the attention network is connected to the input end of the data aggregation network; and
    an output end of the model comprises an output end of the data aggregation network.

6. The method according to claim 3, further comprising:
    pruning, after starting to train the network parameter of the model, a channel in the data processing network according to the attention network.

7. The method according to claim 6, wherein the pruning the channel in the data processing network according to the attention network, comprises:
    acquiring an attention weight of each channel in the attention network; and
    pruning the channel in the data processing network according to the attention weight.

8. The method according to claim 7, wherein the pruning the channel in the data processing network according to the attention weight, comprises:
    for any one channel in the attention network, determining whether an attention weight of the channel in the attention network is less than a preset channel pruning threshold, and in a case where the attention weight of the channel in the attention network is less than the preset channel pruning threshold, pruning a channel in the data processing network corresponding to the channel in the attention network.

9. The method according to claim 8, further comprising:
    in the case where the attention weight of the channel in the attention network is less than the preset channel pruning threshold, acquiring a first number of channels remaining in the data processing network and acquiring a second number of channels in the data processing network corresponding to the channel in the attention network;
    determining whether a difference between the first number and the second number is greater than or equal to a preset minimum channel threshold; and
    in a case where the difference is greater than or equal to the preset minimum channel threshold, executing the step of pruning the channel in the data processing network corresponding to the channel in the attention network.

10. The method according to claim 4, wherein an input end of the model comprises an input end of the data processing network;
- an output end of the data processing network is connected to an input end of the data aggregation network;
- an output end of the attention network is connected to the input end of the data aggregation network; and
- an output end of the model comprises an output end of the data aggregation network.

11. An electronic device, comprising:
- a processor, and
- a non-transitory memory, storing executable codes therein which, when executed by the processor, cause the processor to perform operations for a model, wherein the model at least comprises a data processing network, an attention network, and a data aggregation network, including:
- processing input data based on the data processing network, to obtain intermediate data;
- acquiring a fixed attention feature output by the attention network, wherein the fixed attention feature is obtained after training the model with at least an initialized attention feature, and respective attention weights comprised in the initialized attention feature are not all the same; and
- processing the intermediate data based on the data aggregation network in the model and according to the fixed attention feature, to obtain output data.

12. The electronic device according to claim 11, wherein the initialized attention feature comprises one layer of attention weights, and a plurality of attention weights in the one layer of attention weights are not all the same;
or,
the initialized attention feature comprises at least two layers of attention weights, and attention weights of different layers are not all the same.

13. The electronic device according to claim 11, wherein the executable codes are executed by the processor to cause the processor to perform operations of:
- acquiring a sample input data set, wherein the sample input data set comprises at least one sample input data;
- building a network structure of the model, wherein the network structure at least comprises the data processing network, the attention network and the data aggregation network, and the attention network is configured for outputting an attention feature, and wherein the sample input data is not input to the attention network; and
- using the sample input data in the sample input data set to train a network parameter of the model until the network parameter converges, to obtain the model.

14. The electronic device according to claim 13, wherein the data processing network is configured for acquiring the sample input data and processing the sample input data, to obtain sample intermediate data;
- the attention network is configured for outputting the attention feature and the output attention feature comprises a plurality of attention weights; and
- the data aggregation network is configured for processing the sample intermediate data according to the attention feature output by the attention network, to obtain a sample output result.

15. The electronic device according to claim 13, wherein an input end of the model comprises an input end of the data processing network;
- an output end of the data processing network is connected to an input end of the data aggregation network;
- an output end of the attention network is connected to the input end of the data aggregation network; and
- an output end of the model comprises an output end of the data aggregation network.

16. The electronic device according to claim 13, wherein the executable codes are executed by the processor to cause the processor to perform operations of:
- pruning, after starting to train the network parameter of the model, a channel in the data processing network according to the attention network.

17. The electronic device according to claim 16, wherein the executable codes are executed by the processor to cause the processor to perform operations of:
- acquiring an attention weight of each channel in the attention network; and
- pruning the channel in the data processing network according to the attention weight.

18. The electronic device according to claim 17, wherein the executable codes are executed by the processor to cause the processor to perform operations of:
- for any one channel in the attention network, determining whether an attention weight of the channel in the attention network is less than a preset channel pruning threshold, and in a case where the attention weight of the channel in the attention network is less than the preset channel pruning threshold, pruning a channel in the data processing network corresponding to the channel in the attention network.

19. The electronic device according to claim 18, wherein the executable codes are executed by the processor to cause the processor to perform operations of:
- in the case where the attention weight of the channel in the attention network is less than the preset channel pruning threshold, acquiring a first number of channels remaining in the data processing network and acquiring a second number of channels in the data processing network corresponding to the channel in the attention network;
- determining whether a difference between the first number and the second number is greater than or equal to a preset minimum channel threshold; and
- in a case where the difference is greater than or equal to the preset minimum channel threshold, executing the step of pruning the channel in the data processing network corresponding to the channel in the attention network.

20. A non-transitory machine-readable storage medium, storing executable codes therein which, when executed by a processor, cause the processor to perform the data processing method according to claim 1.

* * * * *